J. G. BALING.
NUT LOCK.
APPLICATION FILED FEB. 24, 1911.
996,962.
Patented July 4, 1911.
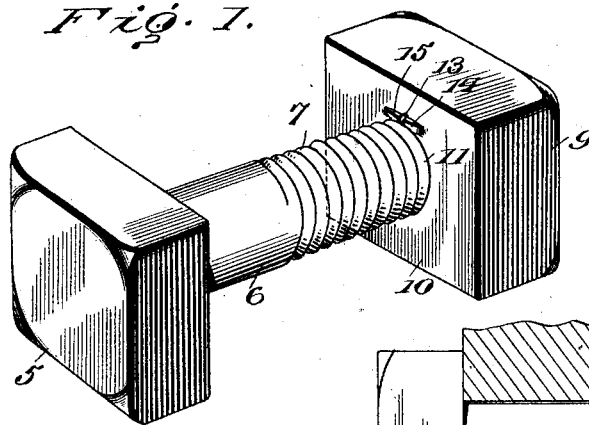
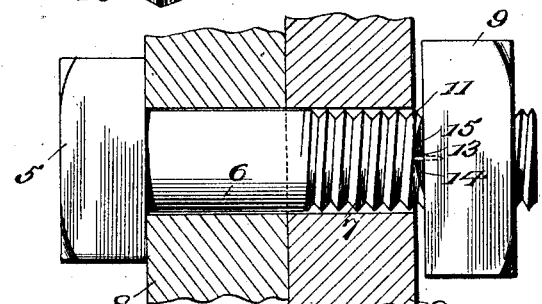
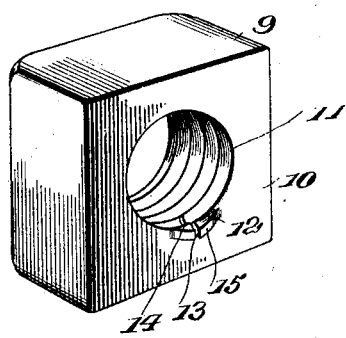
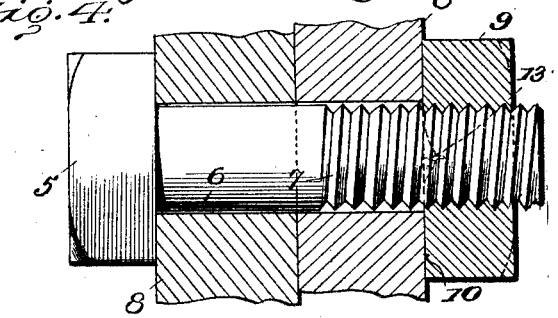
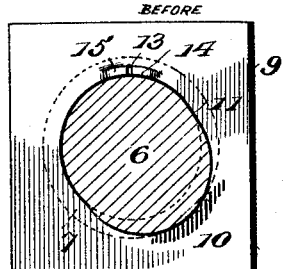
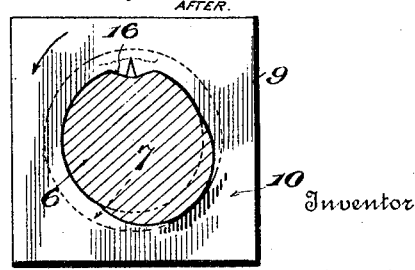
Inventor
J. G. Baling.

UNITED STATES PATENT OFFICE.

JOHN G. BALING, OF BALTIMORE, MARYLAND.

NUT-LOCK.

996,962.

Specification of Letters Patent. Patented July 4, 1911.

Application filed February 24, 1911. Serial No. 610,651.

*To all whom it may concern:*

Be it known that I, JOHN G. BALING, citizen of the United States, residing at Baltimore, in the State of Maryland, have invented certain new and useful Improvements in Nut-Locks, of which the following is a specification.

This invention relates to nut locks and has for its object the provision of a comparatively simple and thoroughly efficient device of this character, by means of which a nut may be securely locked against accidental rotation on a threaded bolt without the employment of spring washers, keys and similar auxiliary fastening devices.

A further object of the invention is to provide a nut, the construction of which is such that the nut will automatically bind or lock itself upon the threaded shank of a bolt when said nut is rotated in contact with a fish plate or other support.

A further object is to provide a nut having the lower or inner thread thereof split on a line parallel with the axis of the bolt, said nut being formed on its inner face with spaced lugs disposed on opposite sides of said split portion and having cutting edges adapted to bite into the adjacent threads on the bolt when the nut is adjusted on said bolt to a final bearing.

A still further object of the invention is generally to improve this class of devices so as to increase their utility, durability and efficiency, as well as to reduce the cost of manufacture.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 is a perspective view of a bolt provided with a nut constructed in accordance with my invention; Fig. 2 is a perspective view of the nut detached; Fig. 3 is a vertical sectional view, showing the nut adjusted on the threaded end of the bolt preparatory to locking the same; Fig. 4 is a similar view, showing the nut rotated in contact with the support and locked in engagement with the threaded shank of the bolt; Fig. 5 is a horizontal sectional view, showing the position of the lugs before the latter are forced in contact with the threads on the bolt; Fig. 6 is a similar view, showing the shape of the lugs after being mashed or depressed by contact with the support.

Corresponding and like parts are referred to in the following description and indicated in all the views of the drawing by the same reference characters.

The improved nut lock forming the subject matter of the present invention may be used in connection with the securing bolts of railway rails, metal building structures, bridge work and the like, and by way of illustration is shown applied to a bolt of the ordinary construction, in which 5 designates the head of the bolt and 6 the shank having its threaded end 7 passing through a fish plate or other support 8 for engagement with a nut, indicated at 9. The nut 9 may be made of any desired shape or configuration, but is preferably substantially rectangular and provided on its inner face with a flat bearing surface 10 extending from the bolt receiving opening 11 to the outer edge of said nut.

Secured to or formed integral with the flat bearing surface 10 of the nut, is a projection or enlargement, the inner face of which is inclined in the direction of the bolt receiving opening 11 to form a cutting edge 12, the latter being curved to conform to and constituting a continuation of the inner or lower thread of the nut. The projection or enlargement on the inner face of the nut is provided with a vertical kerf or incision 13, intersecting the adjacent thread of the nut and defining oppositely disposed lugs 14 adapted to be forced into the threads on the shank of the bolt when the nut is adjusted to its final bearing in contact with the support 8. The lugs 14 are inclined or beveled from the kerf 13 to the flat bearing surface 10 of the nut so that as said nut is rotated on the adjacent face of the support 8, the inclined faces 15 of the lugs will ride over the face of the support 8 until the pressure of the nut against the support mashes or depresses the lugs, thus to cause the cutting edges 12 of said lugs to bite into the threads on the bolt and securely lock said nut against accidental rotation. It will here be noted that when the nut is adjusted in contact with the support 8, the lugs 14 will be flattened so that the inner faces of the lugs at the cutting edges 12 thereof will be slightly separated, thus causing said cutting edges to bite into the thread and form shoulders 16. It will also be noted that the height of the lugs 14 is slightly less than the width of the grooves between the threads on the shank so as to permit the nut to be readily adjusted on the bolt without binding or wedging action between the parts.

In using the device, the nut is rotated on the threaded shank of the bolt until the bearing face 10 engages the adjacent face of the support 8, when the lugs, by contact with said bearing face 10, will be forced inwardly so as to cause the cutting edges 12 of the lugs to bite into the threads on the bolt, as best shown in Figs. 4 and 6 of the drawing. With the bolt in this position, any attempt to further tighten the bolt will be prevented by the support 8, while any rearward rotation of the nut will cause the inner faces of the lugs to lock said nut against accidental displacement.

While it is preferred to provide the inner face of the nut with a single pair of lugs, it will of course be understood that any number of pairs of lugs may be provided, in which event, each set of lugs will be separated by a kerf or incision.

The device is extremely simple in construction and may be manufactured and placed on the market at a comparatively small cost.

Having thus described the invention, what is claimed as new is:

1. The combination with a bolt, of a nut having a portion of one of the threads thereof extended outwardly beyond the adjacent face of the nut and split for engagement with the threads on the bolt.

2. The combination with a bolt, of a nut having a split enlargement formed on one face thereof at the bolt receiving opening, and adapted to be forced into engagement with the adjacent threads on the bolt.

3. The combination with a support having a bolt extending therethrough, of a nut having an enlargement formed on the inner face thereof and provided with a kerf intersecting the adjacent thread on the bolt, said enlargement being adapted to be forced into engagement with the threads on the bolt by contact with said support.

4. The combination with a support having a bolt extending therethrough, of a nut having an enlargement formed on the inner face thereof and provided with a kerf intersecting the adjacent thread on the nut, said enlargement being provided with a cutting edge curved to conform to and constituting a continuation of the thread of the nut, said cutting edge being adapted to be forced into engagement with the adjacent thread on the bolt when the nut is adjusted in contact with the support.

5. The combination with a support having a bolt extending therethrough, of a nut having its inner face provided with an enlargement formed with a kerf intersecting the adjacent thread on the nut and defining oppositely disposed lugs, each provided with a cutting edge, said lugs being inclined in opposite directions and the cutting edges thereof being adapted to be forced into engagement with the threads on the bolt when the inner face of the nut bears against said support.

6. The combination with a support having a bolt extending therethrough, of a nut having its inner face formed with a flat bearing surface, there being an enlargement on the bearing surface at the bolt receiving opening and provided with a kerf intersecting the adjacent thread on the nut and defining spaced lugs inclined in the direction of the bearing surface, said lugs being provided with cutting edges curved to conform to and adapted to bite into the threads on the bolt when said bearing surface of the nut engages the adjacent face of the support.

7. The combination with a bolt having a threaded shank, of a nut having a flat inner face provided with an enlargement of less width than the grooves between the threads on the shank of the bolt, said enlargement being provided with a kerf intersecting the adjacent thread on the nut and defining spaced lugs having cutting edges adapted to bite into the threads on said bolt when the nut is adjusted into engagement with a fixed support.

8. A nut having one face thereof provided with an enlargement having a kerf formed therein and defining spaced lugs, the inner faces of which are beveled to form cutting edges conforming to and constituting a continuation of the adjacent thread of the nut.

9. A nut comprising a body portion having a threaded bolt receiving opening formed therein and provided at its inner face with a flat bearing surface, there being an enlargement formed on the flat bearing surface at the bolt receiving opening and provided with a kerf intersecting the adjacent thread of said opening to form spaced lugs, said lugs being inclined in opposite directions and having their inner faces provided with cutting edges curved to conform to and constituting a continuation of the adjacent thread of the nut.

In testimony whereof, I affix my signature in presence of two witnesses.

JOHN G. BALING. [L. S.]

Witnesses:
SAMUEL N. ACKER,
W. N. WOODSON.